(12) United States Patent
Wu et al.

(10) Patent No.: US 6,901,601 B1
(45) Date of Patent: May 31, 2005

(54) OPTICAL RECORDING MEDIUM PROTECTION CASSETTE

(75) Inventors: Chun Han Wu, Hsin Chu (TW); Huan Chang Lin, Hsin Chu (TW)

(73) Assignee: Ritek Corporation, Hsin Chu Industrial Park (TW)

( * ) Notice: Subject to any disclaimer, the term of this patent is extended or adjusted under 35 U.S.C. 154(b) by 0 days.

(21) Appl. No.: 09/489,791

(22) Filed: Jan. 24, 2000

(30) Foreign Application Priority Data

Oct. 11, 1999 (TW) .................................... 88217302 U (51) Int. Cl.$^7$ ............................................. G11B 23/03
(52) U.S. Cl. ................................................... 720/735
(58) Field of Search ...................... 720/735; 369/291; 360/133

(56) References Cited

U.S. PATENT DOCUMENTS 5,748,609 A * 5/1998 Tanaka ....................... 369/291

* cited by examiner

Primary Examiner—George Letscher

(74) Attorney, Agent, or Firm—Quintero Law Office

(57) ABSTRACT

The optical recording medium protection cassette of the present invention comprises a housing, a clasping member and at least one switch member. A first opening for retaining an optical recording medium is formed on a first lateral side of the housing and a groove is formed on the inside of a second lateral side which is perpendicular to the first lateral side. The clasping member is in engagement with the first opening of the housing to restrict the optical recording medium to be located within the housing. The clasping member is provided with at least a first buckling portion and at least a V-shaped portion having a first side and a second side. Each switch member has a first end as a second buckling portion fastened to the first buckling portion of the clasping member, which makes the switch member rotate relative to the first buckling portion, and a second end which is a positioning portion substantially stops at either the first side or the second side of the V-shaped portion.

Furthermore, a clip member is formed at the clasping member, which has a protruding portion to fasten the groove disposed at the inside of the second lateral side of the housing so as to secure the clasping member within the housing, and an annular portion, the protruding portion of the clip member being disengaged from the groove such that the clasping member can be withdrawn from the housing by switching the annular portion.

4 Claims, 7 Drawing Sheets

OPTICAL RECORDING MEDIUM PROTECTION CASSETTE

BACKGROUND OF THE INVENTION (a) Field of the Invention

The present invention relates to an optical recording medium protection cassette, and in particular, to a durable protection cassette with a switch member to indicate protection status of the recording medium.

(b) Description of the Prior Art

Optical principle is commonly employed in storing or recording data in various media, such as Compact Disc (CD), Video Compact Disc (VCD), Digital Versatile Disc (DVD). There are plenty of advantages by employing such optical data recording medium (hereinafter referred as optical recording medium), such as lightweight, thin, short and small, portable, storage time being long, and capable of storing large quantity of data.

One way of performing read/write of an optical recording medium is to install the optical recording medium into a protection cassette and then deliver the cassette to an optical recording medium read/write machine to access the data stored in the optical recording medium. This way of data-accessing, like a floppy disk, is advantageous in that: (1) the surface of the optical recording medium is not subject to scratching; (2) write protection can be set or not on the protection cassette. If write protection of the protection cassette is set, "write-in" to the optical recording medium is not allowed. Thus, loss of important data as a result of accidental "write-in" can be avoided.

Figure 5:
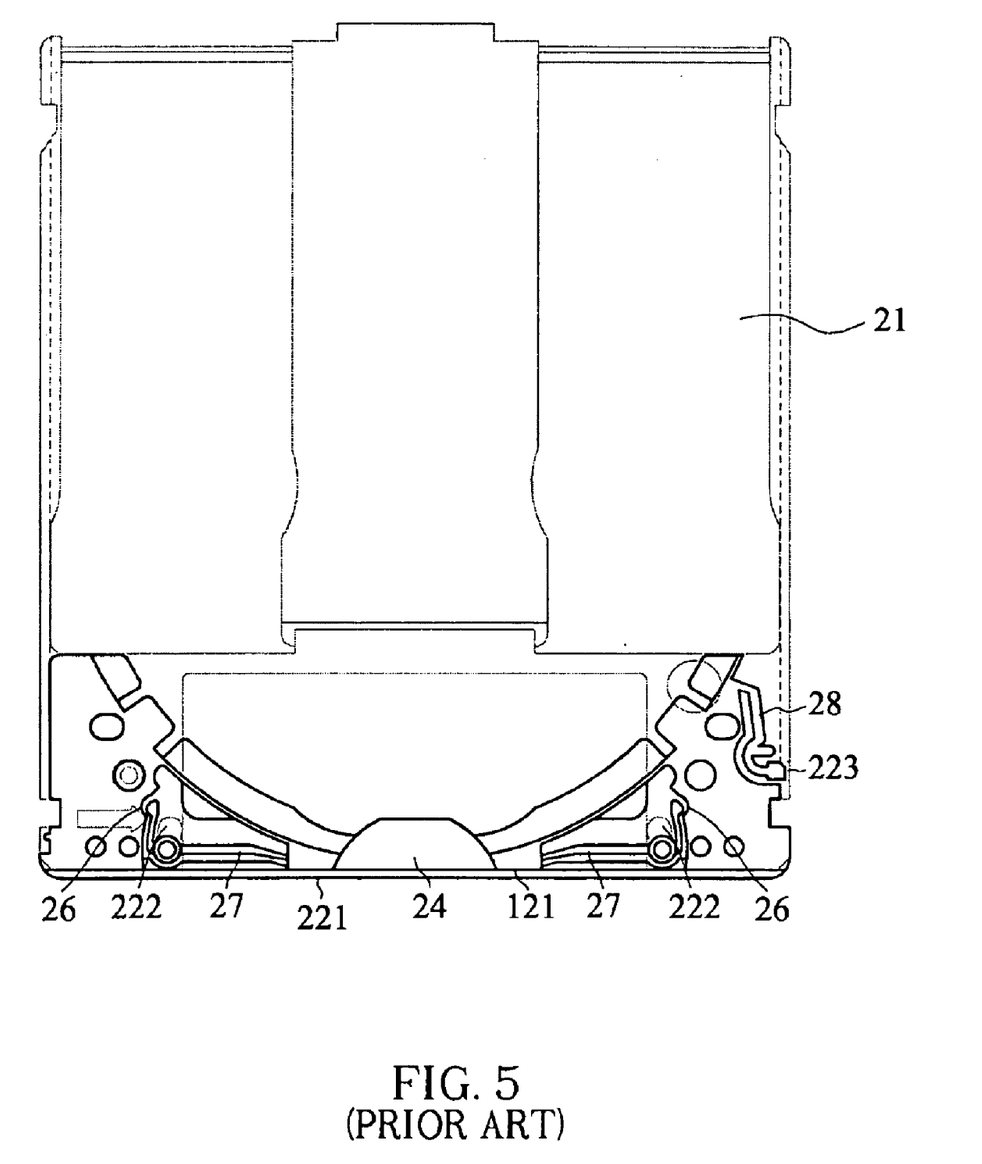
FIG. 5 is a top view, showing the assembly of a conventional optical recording medium protection cassette and an optical recording medium.

FIG. 5 is a schematic view of a conventional optical recording medium protection cassette, which comprises a housing 21 having a first opening 221 at a first lateral side thereof for retaining an optical recording medium, and a third opening 223 being formed at a second lateral side which is perpendicular to the first lateral side; a clasping member 24 being engaged with the first opening 221 of the housing 21 to restrict the optical recording medium within the housing 21; and two second openings 222.

Figure 6A:
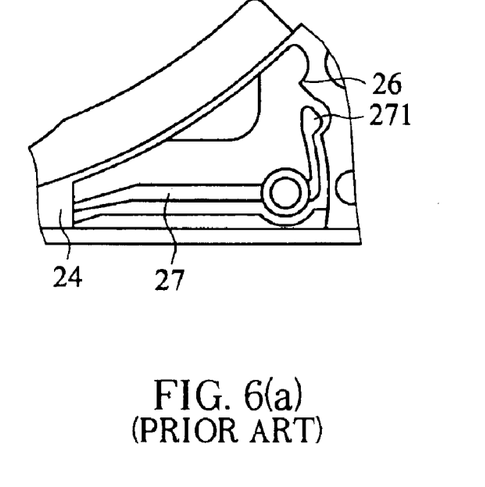
FIG. 6(a) is a partial enlarged view, showing the position of the switch member at the write protection status of a conventional optical recording medium protection cassette.
Figure 6B:
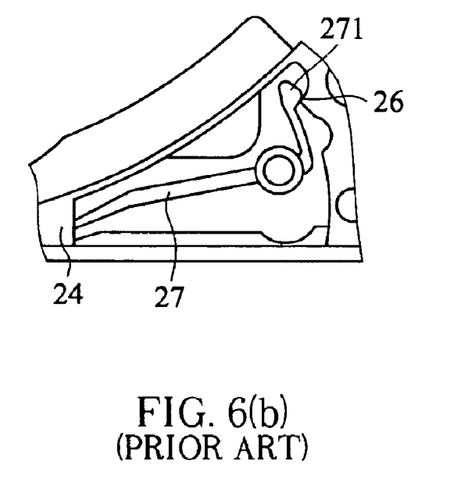
FIG. 6(b) is a partial enlarged view, showing the position of a switch member at non-write protection status of a conventional optical recording medium protection cassette.

The clasping member 24 is provided with a V-shaped portion 26 and a switch member 27. One end of the switch member 27 is integrally connected at the clasping member 24, the other end is provided with a protruding portion 271. FIGS. 6(a) and 6(b) are partial enlarged views of the clasping member 24, the V-shaped portion 26 and the switch member 27. Referring to FIGS. 6(a) and 6(b), the straight line distance from the connection of the switch member 27 and the clasping member 24 to the apex of the positioning/protruding portion 271 is longer than the straight line distance from the connection of the switch member 27 and the clasping member 24 to the apex of the V-shaped portion 26. Therefore, the position of the apex of the positioning/protruding portion 271, as shown in FIG. 6(a), is at the upper side of the V-shaped portion 26. Alternatively, as shown in FIG. 6(b), the position of the apex of the positioning/protruding portion 271 is at the lower side of the V-shaped portion 26. When the positioning/protruding portion 271 is switched, a substantially elastic deformation occurs as the switch member 27 is substantially L-shaped, such that the positioning/protruding portion 271 can pass through the apex of the V-shaped portion 26. Therefore, the positioning/protruding portion 271 switches at the two states as shown in FIGS. 6(a) and 6(b). Consequently, the write protection status of the optical recording medium in the optical recording medium protection cassette can be represented by switching the position of the positioning/protruding portion 271 of the switch member 27.

The position of the second opening 222 on the housing 21 corresponds to the positioning/protruding portion 271. Therefore, when the clasping member 24 is engaged with the housing 21, the positioning/protruding portion 271 can be switched.

Figure 7A:
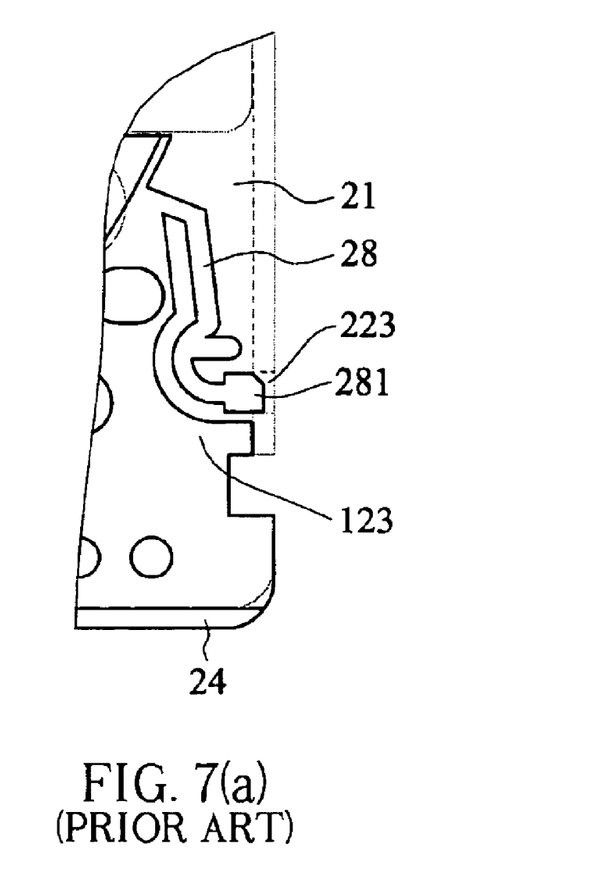
FIG. 7(a) is a partial enlarged view, showing the position of a clip member when it is fastened to the groove of a conventional optical recording medium protection cassette.
Figure 7B:
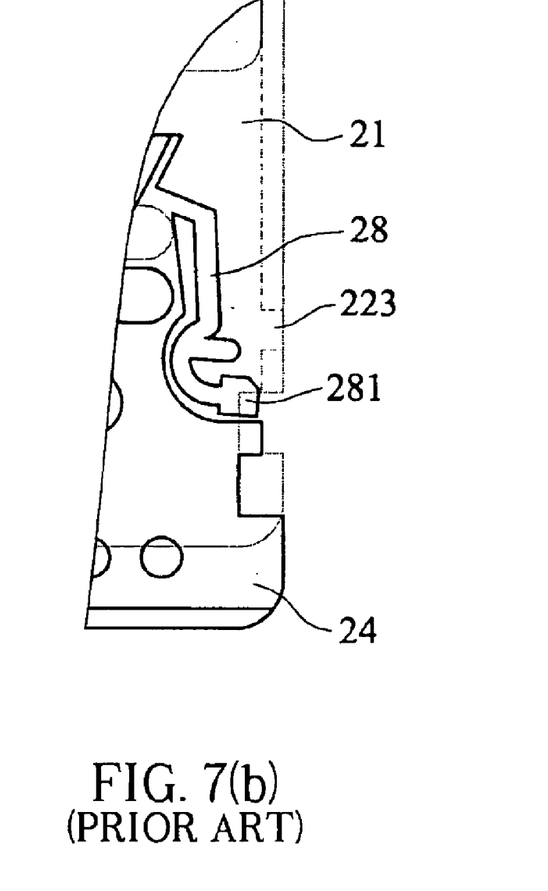
FIG. 7(b) is a partial enlarged view, showing the position of the clip member when it is disengaged from the groove of a conventional optical recording medium protection cassette.

A clip member 28 is formed at the clasping member 24, which has a protruding portion 281 for engaging a third opening 223 on a lateral side of the housing 21, so as to secure the clasping member 24 within the housing 21. FIGS. 7(a) and 7(b) are partial enlarged views of the clip member 28 of the clasping member 24. Referring to FIGS. 7(a) and 7(b), if the clasping member 24 is to be withdrawn, the protruding portion 281 must be pushed away from the third opening 223 via the outside of the housing 21, and then the protruding portion 281 must be pushed down slightly so as to withdraw the clasping member 24 from the housing 21. In this way, the optical recording medium of the optical recording protection cassette can be withdrawn.

The connection between the switch member 27 and clasping member 24 is apt to split as a result of bending while switching the switch member 27. Since the switch member 27 and the clasping member 24 are formed integrally, and the switch member 27 at the write protection status and at non-write protection status are located at different positions, the connection of the switch member 27 and the clasping member 24 must be narrow to facilitate bending. As a result, the connection is apt to split after several times of bending and the function to set write protection for the optical recording medium in the optical recording medium protection cassette will be lost.

Another drawback of the prior art is that the sharp angle at the apex of the positioning/protruding portion 271 and the apex of the V-shaped portion 26 will become blunt after switching for several times. If the bluntness is severe, the distance from the connection of the switch member 27 and the clasping member 24 to the apex of the positioning/protruding portion 271 may approximate to the distance from the connection of the switch member 27 and the clasping member 24 to the apex of the V-shaped portion 26. This causes poor positioning function between the positioning/protruding portion 271 and the V-shaped portion 26. Therefore, the function of write protection indication is lost.

Still another drawback of the prior art is that the operation of the clip member 28 is not easy. It is thus not easy to withdraw the clasping member 24. Specifically, when the clasping member 24 is to be withdrawn, the protruding portion 281 of the clip member 28 must be pushed inward and the clasping member 24 must be pushed slightly sidewards. Otherwise, the protruding portion 281 will re-bounce back to the third opening 223. However, in accordance with the prior art, it is not easy to push the clasping member sidewards. Therefore, the optical recording medium is not easily withdrawn from the optical recording medium protection cassette, and not easily loaded into the optical recording medium protection cassette.

SUMMARY OF THE INVENTION

It is an object of the present invention to provide an optical recording medium protection cassette, wherein the switch member to indicate write protection status is not apt to split.

It is another object of the present invention to provide an optical recording medium protection cassette, wherein the installation or unloading of the optical recording medium is convenient.

To achieve the above objects, the optical recording medium protection cassette of the present invention comprises a housing, a clasping member and at least one switch member. A first opening for retaining an optical recording medium is formed on a first lateral side of the housing and a groove is formed on the inside of a second lateral side which is perpendicular to the first lateral side. The clasping member is in engagement with the first opening of the housing to restrict the optical recording medium to be located within the housing. The clasping member is provided with at least a first buckling portion and at least a V-shaped portion having a first side and a second side. Each switch member has a first end as a second buckling portion fastened to the first buckling portion of the clasping member, which makes the switch member rotate relative to the first buckling portion, and a second end which is a positioning portion substantially stops at either the first side or the second side of the V-shaped portion.

Furthermore, a clip member is formed at the clasping member, which has a protruding portion to fasten the groove disposed at the inside of the second lateral side of the housing so as to secure the clasping member within the housing, and a annular portion, the protruding portion of the clip member being disengaged from the groove such that the clasping member can be withdrawn from the housing by switching the annular portion.

In accordance with the present invention, since the switch member can rotate relative to the clasping member, the situation that the switch member splitting from the clasping member will not occur.

In accordance with the present invention, the bluntness of the switch member causing a loss of positioning function will not occur.

In accordance with the present invention, the annular portion of the clip member can be simultaneously switched inwardly and sidewards. The clasping member is thus easily withdrawn. Specifically, loading and unloading of optical recording medium is easy.

The aforesaid and other features of the invention are made more apparent in the following detailed description when read in conjunction with the attached drawings.

DETAILED DESCRIPTION OF THE PREFERRED EMBODIMENTS

Figure 1:
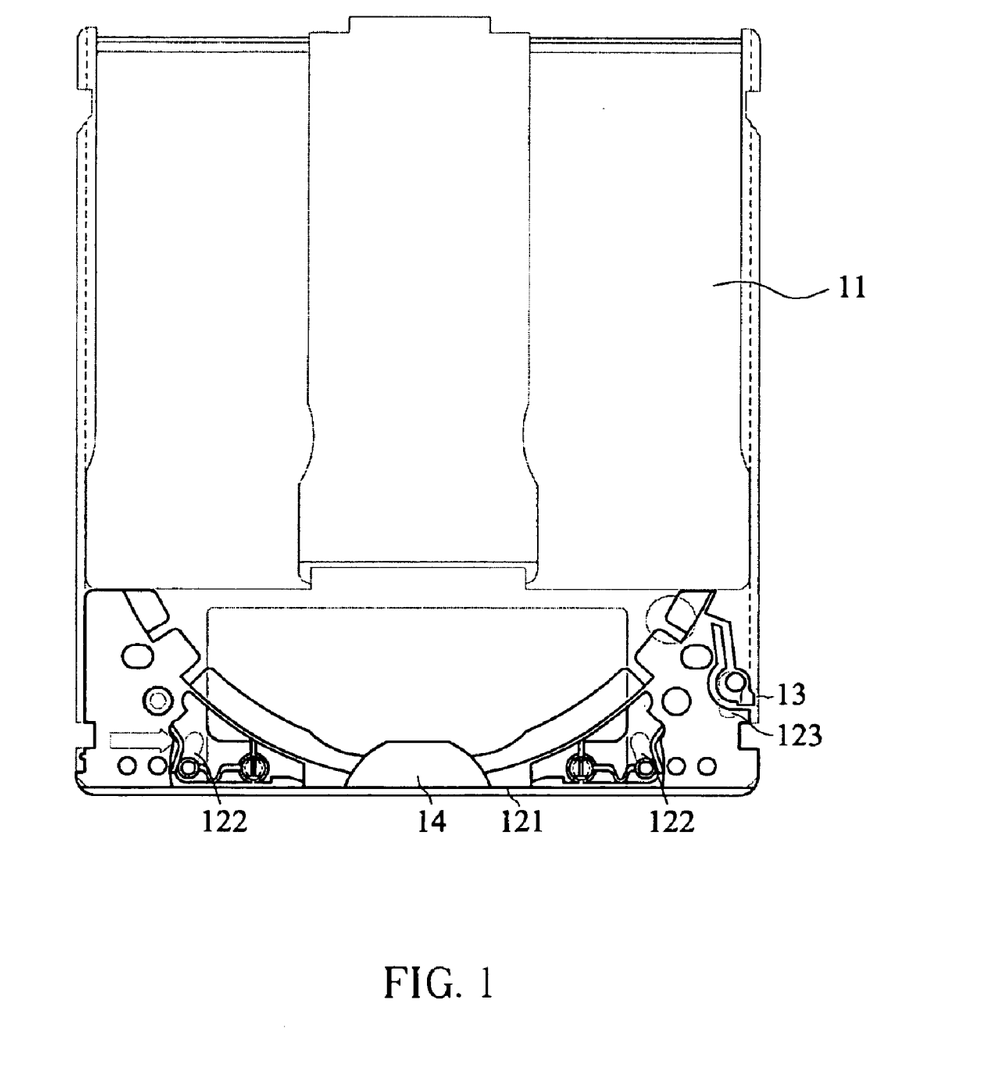
FIG. 1 is a top view, showing the assembly of the optical recording medium protection cassette and the optical recording medium in accordance with the preferred embodiment of the present invention.

FIG. 1 schematically shows an optical recording medium protection cassette of a preferred embodiment of the present invention, which comprises a housing 11 having a first opening 121 formed at a first lateral side of the housing 11 for retaining an optical recording medium and a groove 13 formed at the inside of a second lateral side perpendicular to the first lateral side; a clasping member 14 in engagement with the first opening 121 of the housing 11 to restrict the optical recording medium to be located within the housing 11; two second openings 122; and a third opening 123.

Figure 2A:
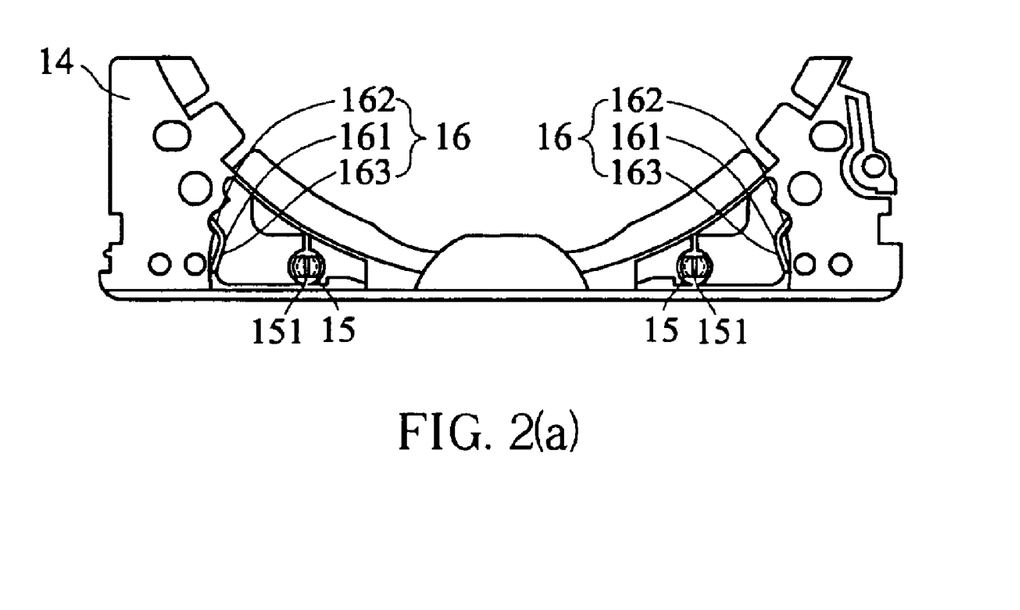
FIG. 2(a) is a top view, showing the clasping member of the optical recording medium protection cassette in accordance with the preferred embodiment of the present invention.
Figure 2B:
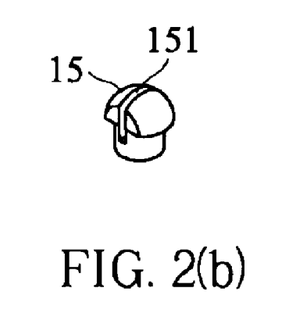
FIG. 2(b) is a perspective view, showing the first buckling portion of the optical recording medium protection cassette in accordance with the preferred embodiment of the present invention.

FIG. 2(a) schematically shows an optical recording medium protection cassette of the preferred embodiment. The clasping member 14 is provided with two first buckling portions 15 and two V-shaped portions 16. FIG. 2(b) is a partial perspective view of the first buckling portion 15. The first buckling portion 15 is substantially divided into two portions, the portion connected to the clasping member 14 has a smaller diameter and is cylindrical, the other portion has a larger diameter. A trench 151 is provided diametrically at the first buckling portion 15 and two side portions of the trench 151 are inclined towards the trench 151 so that the diameter is tapered. The two V-shaped portions 16 corresponding to the two lateral sides of the apex 161 are respectively provided with a first side 162 and a second side 163.

Figure 2C:
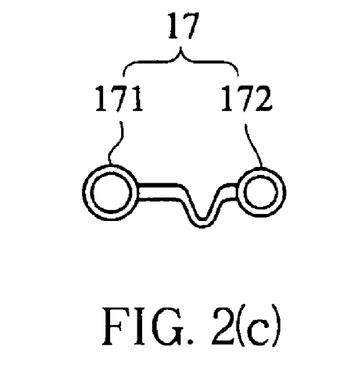
FIG. 2(c) is a top view, showing the switch member of the optical recording medium protection cassette in accordance with the preferred embodiment of the present invention.

FIG. 2(c) is a top view showing a switch member 17 of the optical recording medium protection cassette in accordance with the preferred embodiment. One end of the switch member 17 is a second buckling portion 171 and the other end is a positioning portion 172. The second buckling portion 171 is annular and has an internal diameter substantially equal to the diameter of the cylindrical portion (the portion with smaller diameter) of the first buckling portion 15. When the second buckling portion 171 is fastened to the first buckling portion 15, the second buckling portion 171 contacts with the portion with larger diameter of the first buckling portion 15 such that the two side portions of the trench 151 are pushed toward the trench 151 such that the diameter is reduced. In this way, the second buckling portion 171 can pass through and eventually is telescoped over the cylindrical portion with smaller diameter of the first buckling portion 15. Next, after the second buckling portion 171 has passed through, the portion with larger diameter of the first buckling portion 15 recovers to its original shape, which has larger diameter than the internal diameter of the second buckling portion 171. The second buckling portion 171 thus can be telescoped over the cylindrical portion with smaller diameter of the first buckling portion 15 without dislocation. Furthermore, the second buckling portion 171 can rotate relative to the first buckling portion 15. Therefore, the switch member 17 can rotate relative to the first buckling portion 15.

Figure 3A:
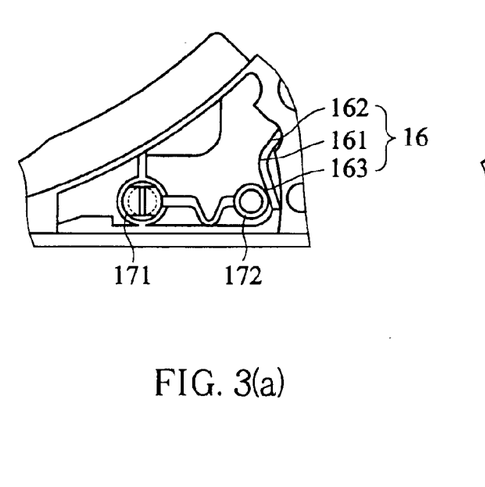
FIG. 3(a) is a partial enlarged view, showing the position of the switch member at write protection status within the optical recording medium protection cassette in accordance with the preferred embodiment of the present invention.
Figure 3B:
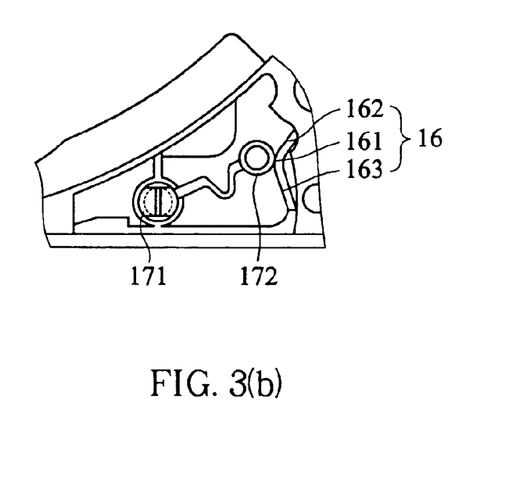
FIG. 3(b) is a partial enlarged view, showing the position of the switch member at non-write protection status within the optical recording medium protection cassette in accordance with the preferred embodiment of the present invention.

FIGS. 3(a) and 3(b) are enlarged views of the V-shaped portion 16 and the switch member 17 of the clasping member 14. Referring to FIGS. 3(a) and 3(b), since the farthest distance from the center of the second buckling portion 171 of the switch member 17 to the positioning portion 172 is longer than the distance from the center of the second buckling portion 171 of the switch member 17 to the apex 161 of the V-shaped portion 16, the positioning portion 172 will stop at a position near to the first side 162 of the V-shaped portion 16, as shown in FIG. 3(a), or it will stop at a position near to the second side 163 of the V-shaped portion 16, as shown in FIG. 3(b). As the switch member 17 is of curved shape, it somewhat provides a flexible deformation. Therefore, when the positioning portion 172 is switched, the positioning portion 172 passes through the apex 161 of the V-shaped portion 16 and switches at the two states as shown in FIGS. 3(a) and 3(b). In this way, the state whether the optical recording medium in the optical recording medium protection cassette is subject to write protection can be switched by changing the position of the positioning portion 172 of the switch member 17.

On the housing 11, the position of the second opening 122 corresponds to the positioning portion 172 on the switch member 17. Thus, the positioning portion 172 can be switched via the second opening 122 such that it stops at the first side 162 or the second side 163 of the V-shaped portion 16.

Since the second buckling portion 171 of the switch member 17 can rotate relative to the first buckling portion 15 of the clasping member 14, the connection of the switch member 17 and the clasping member 14 will not split, as in prior art. Besides, since the positioning portion 172 of the switch member 17 is of circular arc shape, and the apex 161 of the V-shaped portion 16 can be of circular arc shape as well (without affecting the positioning function), the bluntness caused by the sharp angle as stated in the conventional optical recording medium cassette will not occur. In view of the above, the longevity of the switch member 17 within the optical recording medium protection cassette is improved.

Figure 4A:
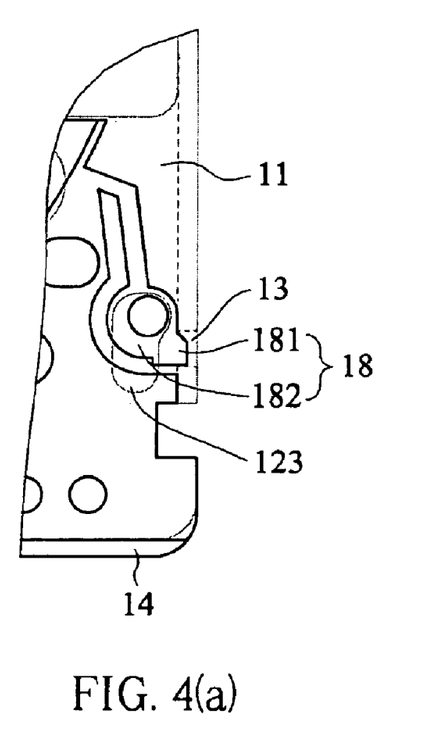
FIG. 4(a) is a partial enlarged view, showing the position of the clip member when it is fastened to the groove of the optical recording medium protection cassette in accordance with the preferred embodiment of the present invention.
Figure 4B:
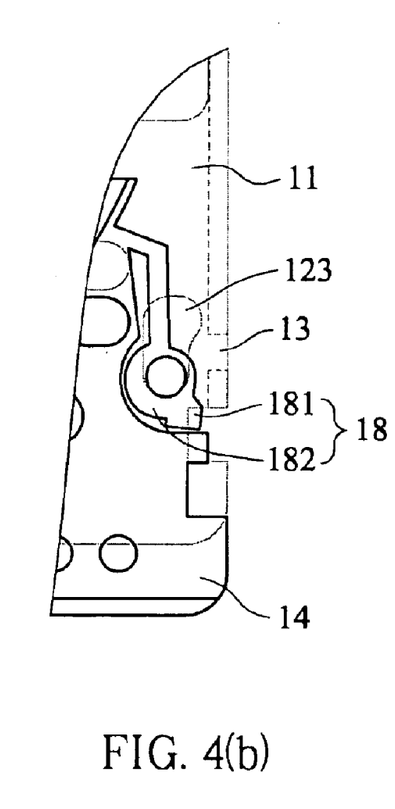
FIG. 4(b) is a partial enlarged view, showing the position of the clip member when it is disengaged from the groove of the optical recording medium protection cassette in accordance with the preferred embodiment of the present invention.

In accordance with the preferred embodiment, a clip member 18 is formed at the clasping member 14, which has a protruding portion 181 to fasten the groove 13 disposed at the inside of the second lateral side of the housing 11 so as to secure the clasping member 14 within the housing 11, and an annular portion 182, the protruding portion 181 of the clip member 18 being disengaged from the groove 13 such that the clasping member 14 can be withdrawn from the housing 11 by switching the annular portion 182. FIGS. 4(a) and 4(b) show the enlarged views of the clip member 18 within the clasping member 14. Referring to FIGS. 4(a) and 4(b), the clasping member 14 can be withdrawn by moving the annular portion 182, pushing the protruding portion 181 away from the groove 13, and moving the protruding portion 181 downward such that the clasping member 14 is withdrawn from the housing 11. In this way, the optical recording medium within the optical recording medium protection cassette can be withdrawn.

On the housing 11, the position of the third opening 123 corresponds to the position of the annular portion 182, the annular portion 182 thus can be switched via the third opening 123. In this way, the protruding portion 181 can first be slightly moved inward and then be moved inward and downward simultaneously, finally be moved downward. Accordingly, the clasping member 14 can be withdrawn in a simpler way than that in prior art.

Although the invention has been explained with reference to its preferred embodiment, it is to be understood that other modifications and variations can be made without departing from the spirit and scope of the invention as hereinafter claimed.

What is claimed is:

1. An optical recording medium protection cassette comprising:
   a housing, a first opening for retaining an optical recording medium being formed on a first lateral side thereof and a groove being formed on the inside of a second lateral side perpendicular to the first lateral side thereof; and
   a clasping member, in engagement with the first opening of said housing to restrict the optical recording medium to be located within said housing,
   wherein the clasping member is provided with at least a first buckling portion and at least a V-shaped portion having a first side and a second side; and
   the optical recording medium protection cassette further comprises at least a switch member, each switch member has a first end as a second buckling portion fitted on the first buckling portion of said clasping member, making said switch member rotate relative to the first buckling portion, and a second end which is a positioning portion substantially stops at either the first side or the second side of the V-shaped portion.

2. An optical recording medium protection cassette as set forth in claim 1, wherein a second opening is formed at a position of said housing corresponding to the positioning portion, the positioning portion being switched via the second opening.

3. An optical recording medium protection cassette as set forth in claim 1, wherein a clip member is formed at the clasping member, which has a protruding portion to fasten the groove disposed at the inside of the second lateral side of said housing so as to secure said clasping member within said housing, and an annular portion, the protruding portion of said clip member being disengaged from the groove such that said clasping member is withdrawn from said housing by switching the annular portion.

4. An optical recording medium protection cassette as set forth in claim 3, wherein a third opening is formed at a position of said housing corresponding to the annular portion, the annular portion being switched via the third opening, which makes the protruding portion disengage from the groove such that said clasping member is withdrawn.

* * * * *